(12) United States Patent
Lee

(10) Patent No.: US 7,983,724 B2
(45) Date of Patent: Jul. 19, 2011

(54) MOBILE COMMUNICATION TERMINAL

(75) Inventor: Seong Cheol Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 864 days.

(21) Appl. No.: 11/865,549

(22) Filed: Oct. 1, 2007

(65) Prior Publication Data

US 2008/0085747 A1    Apr. 10, 2008

(30) Foreign Application Priority Data

Sep. 29, 2006 (KR) .................. 10-2006-0095486

(51) Int. Cl.
*H04M 1/00* (2006.01)
(52) U.S. Cl. ..................... 455/575.4; 455/129
(58) Field of Classification Search ............... 455/575.1, 455/575.7, 575.4, 129; 343/702
See application file for complete search history.

(56) References Cited

U.S. PATENT DOCUMENTS

| | | | | |
|---|---|---|---|---|
| 5,956,625 A * | 9/1999 | Hansen et al. | ............. | 455/575.4 |
| 6,424,300 B1 * | 7/2002 | Sanford et al. | ................ | 343/702 |
| 7,099,632 B2 * | 8/2006 | Hong et al. | .................. | 455/90.3 |
| 7,599,725 B2 * | 10/2009 | Park et al. | ................... | 455/575.7 |
| 2001/0015705 A1 * | 8/2001 | Scordilis | ....................... | 343/845 |
| 2002/0193138 A1 * | 12/2002 | Chiba et al. | .................... | 455/550 |
| 2004/0038719 A1 * | 2/2004 | Lee | ............................ | 455/575.7 |
| 2004/0090384 A1 * | 5/2004 | Ostervall | ...................... | 343/702 |
| 2004/0185897 A1 * | 9/2004 | Ostervall | ................... | 455/550.1 |
| 2005/0017910 A1 * | 1/2005 | Park | ............................. | 343/702 |
| 2006/0012529 A1 * | 1/2006 | Mattsson et al. | ............. | 343/702 |
| 2006/0202895 A1 * | 9/2006 | Nam et al. | ..................... | 343/702 |
| 2007/0077973 A1 * | 4/2007 | Wu et al. | .................... | 455/575.7 |

FOREIGN PATENT DOCUMENTS

EP        1808929       *    1/2006
KR    10-2006-0166388 Y1    2/2000

* cited by examiner

*Primary Examiner* — Nguyen Vo
*Assistant Examiner* — Ganiyu Hanidu
(74) *Attorney, Agent, or Firm* — Birch, Stewart, Kolasch & Birch, LLP

(57) ABSTRACT

A mobile communication terminal according to the present invention includes a body, a PCB unit provided in a portion of the body for prescribed parts to be mounted, an antenna unit provided in another portion of the body, wherein a feeding point of the antenna unit is apart from the PCB unit, and a feeding connector which connects the feeding point with the PCB unit.

22 Claims, 7 Drawing Sheets

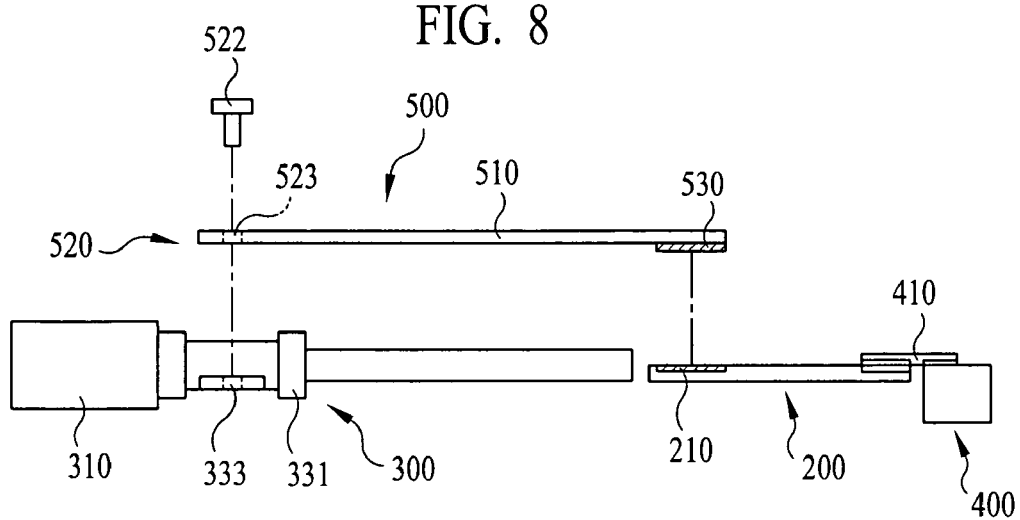
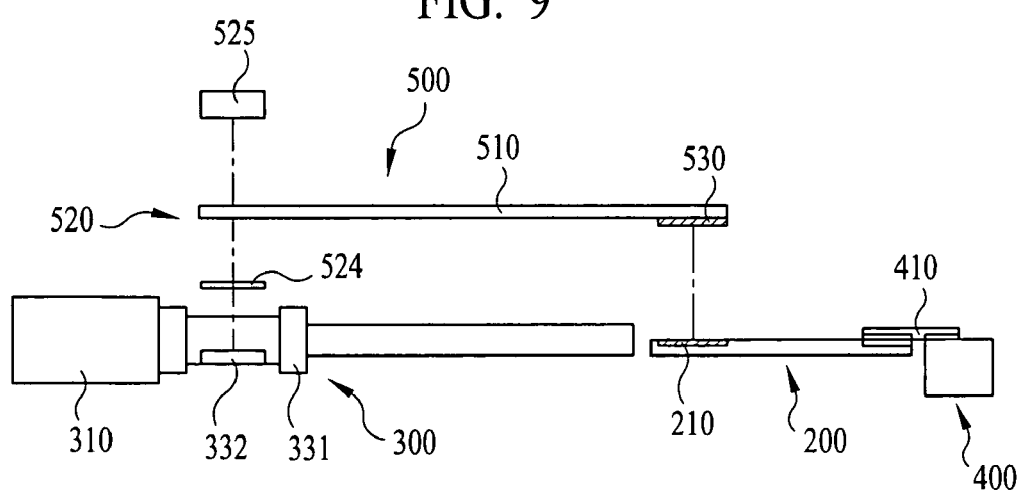

MOBILE COMMUNICATION TERMINAL

This application claims the benefit of the Korean Patent Application No. 10-2006-0095486, filed on Sep. 29, 2006, which is hereby incorporated by reference as if fully set forth herein.

BACKGROUND OF THE INVENTION

1. Field of the Invention

The present invention relates to a mobile communication terminal. More particularly, the present invention relates to a mobile communication terminal that can improve mobile communication terminal usage environments.

2. Discussion of the Related Art

Mobile communication terminals are typically configured of a case, a battery, a circuit substrate and an antenna. The case defines an exterior appearance of a mobile communication terminal and the battery supplies the power to the mobile communication terminal. Various parts are mounted on the circuit substrate. The antenna sends and receives predetermined signals to and from a base station or a satellite station.

However, as a new structure is applied to a conventional mobile terminal, slimness of a conventional mobile terminal happens to face its limitation and it results in a thick mobile communication terminal. In addition, the thick conventional mobile communication terminal might deteriorate wireless communication environments.

SUMMARY OF THE INVENTION

Accordingly, the present invention is directed to a mobile communication terminal substantially obviate one or more problems due to limitations and disadvantages of the related art.

An object of the present invention is to provide a mobile communication terminal that can overcome the limitation of slim mobile communication terminal presentation cased by new structure application, with enhanced wireless communication efficiency for improvement of usage environments.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to the present invention includes a body, a PCB unit provided in a portion of the body for prescribed parts to be mounted, an antenna unit provided in another portion of the body, wherein a feeding point of the antenna unit is apart from the PCB unit, and a feeding connector which connects the feeding point with the PCB unit.

The antenna unit includes a head part provided on an external of the body, a body part provided in the body and selectively sliding out from the body or sliding into the body, and a feeding part formed of the feeding point, and guiding the body part sliding.

The feeding part includes a guide guiding the body part which slides in and out the body, and a connector projected from the guide or combined to the guide, wherein the connector electrically connects with the feeding connector.

The feeding connector includes a FPCB unit of which an end portion is connected with the connector and the other end portion is connected with the PCB unit.

The FPCB unit includes an FPCB which transmits an electric signal between the feeding part and the PCB unit, a joining end connected with the PCB unit, and a connecting part electrically connected with the connector.

In one embodiment, the connecting part includes a contacting member which electrically contacts with the connector to be fixed with the end portion of the FPCB, wherein the contacting member is formed of an electrically conductive material.

In another embodiment, the connecting part includes a hole provided on the end portion of the FPCB, a combining hole provided on the connector of the feeding part, and a combining member inserted in the hole and the combining hole and combining the FPCB with the feeding part.

In another embodiment, the connecting part includes a bonding member of which a surface bonds with the connector and the other opposite surface bonds with the end portion of the FPCB, wherein the bonding member is formed of an electrically conductive material.

Preferably, the mobile communication terminal further includes a holding member which holds the bonding status of the FPCB and the connector.

In another embodiment, the mobile communication terminal further includes an intenna unit provided in the body to be adjacent to and electrically connected with the PCB unit.

Preferably, the body includes a first case forming a front portion of the terminal, and a second case forming a rear portion of the terminal.

Moreover, the body further includes a recess provided on an upper portion of the rear of the second case for a battery to be mounted, a first rear housing portion provided on a lower portion in the second case for the PCB unit to be positioned, and a second rear housing portion provided on a position lower than the first rear housing portion for the intenna unit to be positioned.

Furthermore, the body further includes a first front housing portion provided on a lower portion in the first case for the PCB unit to be positioned, and a second front housing portion provided on a position lower than the first front housing portion for the intenna unit to be positioned.

Moreover, the body further includes an antenna seating portion provided on a side portion in the body for the antenna unit to be positioned.

The antenna seating portion includes a head seating portion provided on an end portion of the body for the head part to be positioned, a holding portion provided on an upper portion of the antenna seating portion for the feeding part to be positioned, and a body seating portion provided on a side portion in the body for the body part to be positioned.

In another embodiment, the body includes a first body having a recess provided on an upper portion of the rear of the first body for a battery to be mounted, and a second body combined with the first body slidably or rotatably.

The first body includes a first housing portion provided on a lower portion in the first body for the PCB unit to be positioned, and a second housing portion provided on a position lower than the first housing portion for the intenna unit to be positioned, an antenna seating portion provided on a side portion in the first body for the antenna unit to be positioned, and a holding portion provided on an upper portion of the antenna seating portion for the feeding part to be positioned.

The FPCB includes a signal part which transmits an electric signal between the feeding part and the PCB unit, a plurality of ground parts provided above, below, in right of, and in left of the signal part, respectively and dielectric substance which fills up around the signal part and the ground part.

In another embodiment of the invention is directed to a mobile communication terminal including a body having a battery mounted on an upper portion of the rear of the body, a PCB unit provided on a lower portion in the body, an intenna unit provided on a position lower than the PCB unit in the body to be connected to the PCB unit, an antenna unit provided on a side portion in the body, the antenna unit having a feeding point provided on an upper portion of the antenna unit to be apart from the PCB unit, and an FPCB unit which connects the feeding point with the PCB unit.

The antenna unit includes a head part, a body part selectively sliding out from the body or sliding into the body, and a feeding part forming the feeding point and guiding the body part sliding.

The feeding part includes a guide guiding the body part which slides in and out the body, and a connector projected from the guide or combined to the guide, wherein the connector electrically connects with the FPCB unit.

The FPCB unit includes a contacting member formed of an electrically conductive material to be electrically connected with the connector.

The connector includes a combining hole, wherein the FPCB unit includes a hole corresponding to the combining hole, and wherein a combining member is inserted in the hole and the combining hole, to combine the connector and the FPCB unit.

The mobile communication terminal further includes a bonding member formed of an electrically conductive material to be bonded on the connector and the FPCB unit respectively.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram illustrating key parts of the mobile communication terminal shown in FIG. 7;

FIG. 9 is a diagram illustrating key parts of the mobile according to the further embodiment of the present invention.

DETAILED DESCRIPTION

Reference will now be made in detail to the preferred embodiments of the present invention, examples of which are illustrated in the accompanying drawings.

A mobile communication terminal according to the present can be applicable to almost all kinds of mobile communication terminals including slide type, folder-type and swing-types mobile communication terminals.

Figure 1:
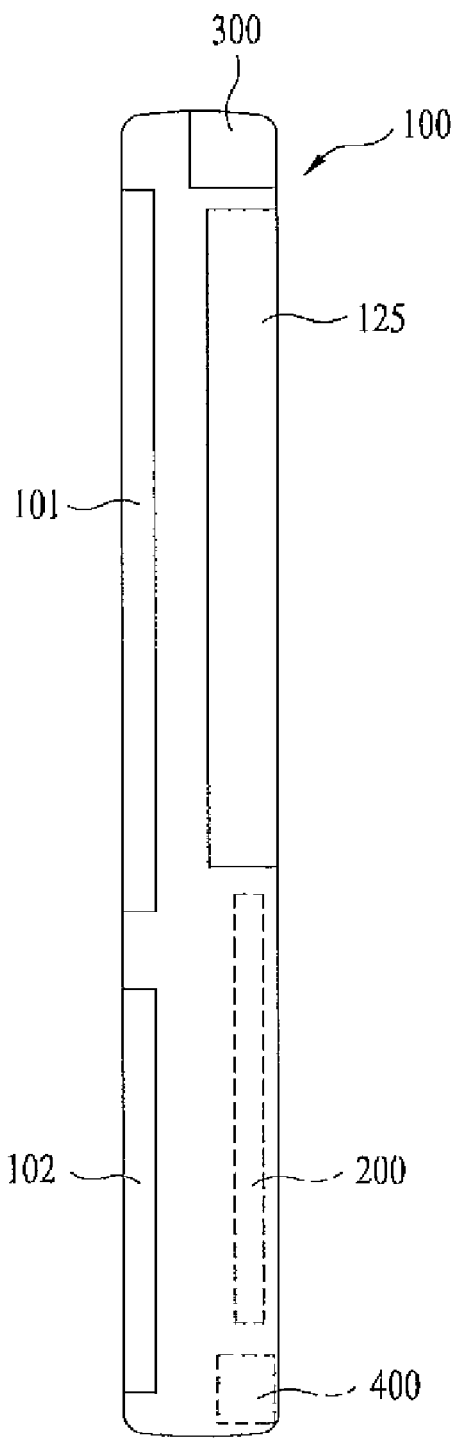
FIG. 1 is a diagram illustrating a side of a mobile communication terminal according to an embodiment of the present invention.
Figure 2:
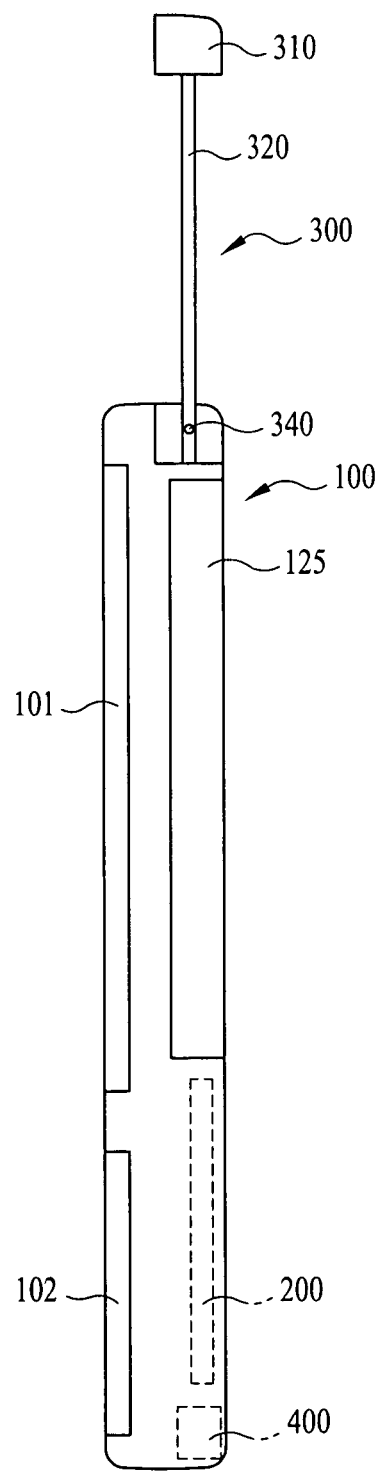
FIG. 2 is a diagram illustrating a state in that an antenna of the mobile communication terminal shown in FIG. 1 is sliding in and out.

Although FIGS. 1 and 2 show a bar-type mobile communication terminal as an example of the present invention, the present invention may be applicable to other types identically.

As shown in FIGS. 1 and 2, a mobile communication terminal according to an embodiment of the present invention includes a body 100, a display window 101 provided on an upper front portion of the body 100 and a keypad 102 for inputting keys.

In addition, a battery 125 is provided on a rear upper portion of the body 100 and a PCB unit 200 (Printed Circuit Board unit) and an intenna unit 400 (inner antenna unit) are mounted below the battery 125.

There is provided an antenna unit 300 in the body 100. The antenna unit 300 is structured to be sliding in and out the body 100 and it includes a head part 310 and a body part 320. A hinge part 340 shown in FIG. 2 rotates the antenna unit 300, such that a user may sliding move the antenna unit in a direction as he/she wants.

The body 100 includes a first case for defining a front surface and a second case of the body 100 for defining a rear surface, which will be explained in reference to as FIG. 3.

Figure 3:
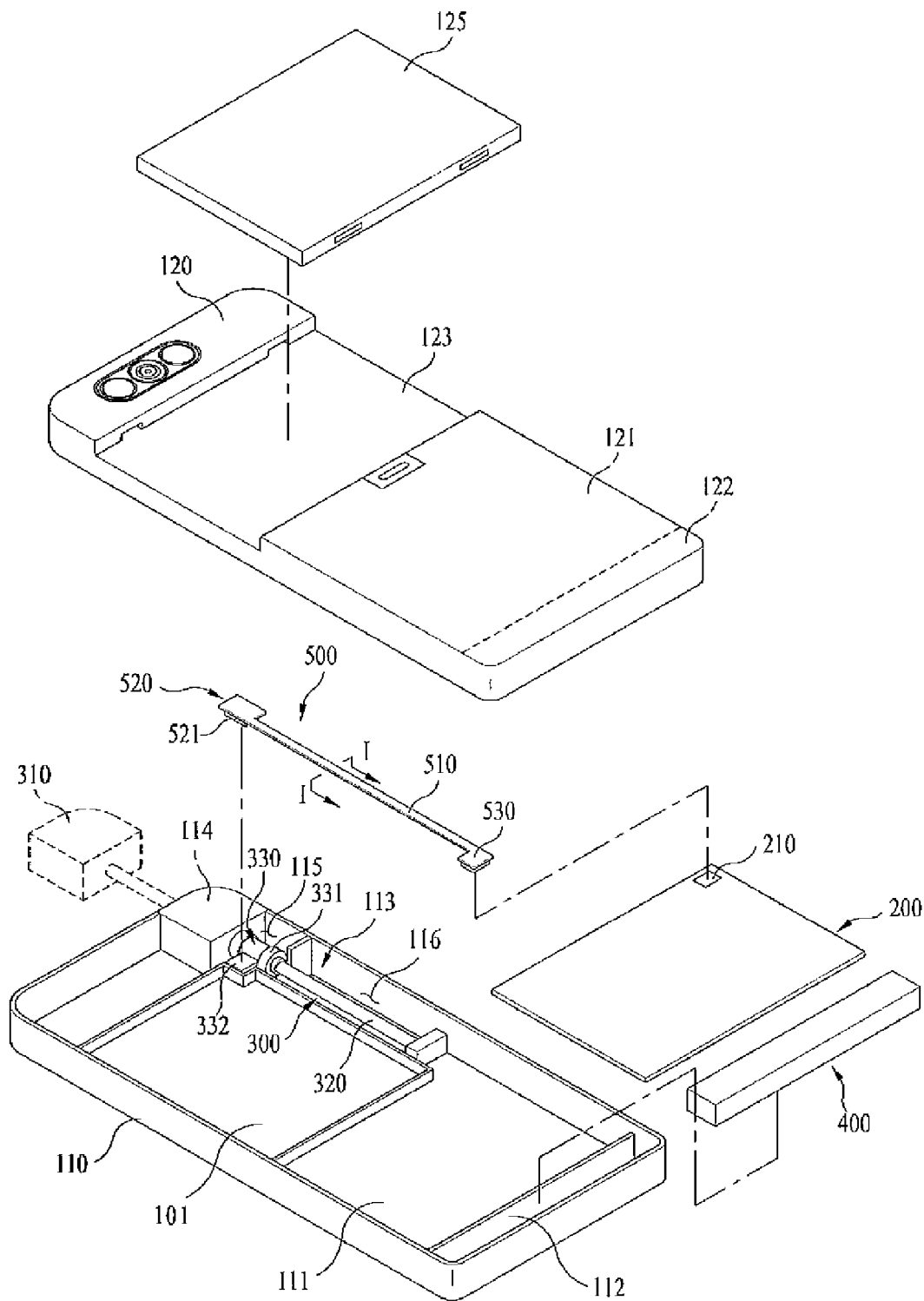
FIG. 3 is an exploded perspective view illustrating the mobile communication terminal shown in FIGS. 1 and 2.

AS shown in FIG. 3, the body 100 of the mobile communication terminal according to the embodiment of the present invention includes a first case 110 and a second case 120.

The battery 125 is mounted on the second case 120 defining the rear surface of the terminal communication terminal and the battery 125 is provided an upper portion of the second case 120.

Specifically, the battery 125 is positioned the upper portion of the second case 120 and there remains a lower space of the second case 120 for the PCB unit 200 and the intenna unit 400 to be mounted in.

A recess 123 is provided at a rear upper portion of the second case 120 and the battery 125 is mounted in the recess 123.

A first rear housing portion 121 and a second rear housing portion 122 are provided under the recess 123.

The first rear housing portion 121 is provided in the second case 120 and the PCB unit 200 is positioned in the first rear housing portion 121. The second rear housing portion 122 is also provided in the second case 120 and the intenna unit 400 is positioned in the second rear housing portion 122.

On the other hand, a display (not shown), the PCB unit 200, the intenna unit 400 and antenna unit 300 are provided a predetermined space of the first case 110.

The display (not shown) is provided in an upper portion inside the first case 110, corresponding to the display window 101.

The PCB unit 200 is corresponding to a first front housing portion 111 of the first case 110 and the intenna unit 400 is corresponding to a second front housing portion 112 of the first case 110.

The first front housing portion 111 is positioned corresponding to the first rear housing portion 121 of the second case 120. When the first case 110 is coupled to the second case 120, the intenna unit 400 is mounted by the second front housing portion 112 and the second rear housing portion 122.

The first front housing portion 111 and the second front housing portion 112 may be partitioned or not.

It is preferable in a view of accurate disposition of parts that the first front housing portion 111 and the second front housing portion 112 are partitioned and that the first rear housing portion 121 and the second rear housing portion 122 are partitioned. As a result, either of the PCB unit 200 and the intenna unit 400 may not transmit heat to the other.

In the meantime, an antenna seating portion 113 is provided in a predetermined side portion of the first case 110 and the antenna unit 200 is installed in the antenna seating portion 113.

The antenna seating portion 113 includes a head seating portion 114, a holding portion 115 and a body seating portion 116.

Here, the antenna unit 300 seated in the antenna seating portion 113 may include a head part 310, a body part 320 and a feeding part 330.

The head seating portion 114 is provided in an upper end portion of the first case 110 and the head part 310 of the antenna unit 300 is seated in the head seating portion 114. The head part 310 is exposed outside and thus the head seating portion 114 is formed in a shape having a groove recessed inward, seen from an outside, in which the head part 310 is seated.

The body seating portion 116 is provided in a side portion of the first case 110 and the body part 320 of the antenna unit 300 is seated in the body seating portion 116.

The holding portion 115 is provided between the head seating portion 114 and the body seating portion 116, and the feeding part 330 is seated in the holding portion 115.

This embodiment of the present invention shown in FIG. 3 presents that the mobile communication terminal includes the antenna unit 300, together with the intenna unit 400, to receive DMB (Digital Multimedia Broadcasting) or the like. However, the mobile communication terminal according to the present invention is not limited to the above presentation and it may include only the antenna unit.

In addition, the mobile communication terminal according to the present invention may include an auxiliary antenna device rather than the intenna unit and the antenna unit.

On the other hand, the feeding part 330 of the antenna unit 300 forms a feeding point. In the mobile communication terminal according to the present invention as shown in FIG. 3, the recess 123 for holding the battery 125 is positioned in an upper portion of the mobile communication terminal and the PCB unit 200 is positioned below the recess 123, which is a new structure.

As a result, if the feeding point of the antenna unit 300 is positioned adjacent to the PCB unit 200, the mobile communication terminal ends up thicker because of space limitation.

That is, if the feeding point of the antenna unit 300 is close to the PCB unit 200, the sizes of the first and second front housing portion 111 and 112 should be larger. This will result in limitation of space for the display and space for a camera (not shown) mounted on the display. Accordingly, an overall size of the case should be substantially large.

Moreover, if the feeding point of the antenna unit 300 is close to the PCB unit 200 in the second case 120, the sizes of the first and second rear housing portion 121 and 122 should be large. This will results in limitation of space for the battery 125 and the camera (not shown) provided on the battery 125. Accordingly, the overall size of the case should be substantially large.

To solve the problem, the feeding point of the antenna unit 300 is positioned at an upper portion of the case and a feeding connector is provided to connect the PCB unit 200 to the feeding point. The detailed explanation of the antenna unit 300 will be described later.

Due to the above configuration, the mobile communication terminal can be slim with maintaining the overall size of the case.

Especially, as shown in FIG. 3, if the intenna unit 400 is provided close to the PCB unit 200, the feeding point of the antenna unit 300 is apart from the PCB unit 200 and thus it is apart from the intenna unit 400. As a result, there is little probability of interference between signals received by the intenna unit 400 and signals received by the antenna unit 300. That is, effects of noises may be reduced only to enhance sensitivity of wireless communication or DMB and to improve communication environments.

In the meantime, if the feeding connector is embodied to be a FPCB (Flexible Printed Circuit Board) unit 500 configured of a FPCB as shown in FIG. 3, the mobile communication terminal can be slimmer.

Especially, if the FPCB unit 500 is lying horizontally as shown in FIG. 3, not standing vertically, the mobile communication terminal can be slimmer.

The FPCB unit 500 includes a FPCB 510, a connecting part 520 and a joining end 530. The FPCB 510 defines an overall body of the FPCB unit 500. The connecting part 520 is provided at an end of the FPCB 510. The joining end 530 is provided at the other opposite end of the FPCB 510.

The connecting part 520 is connected with the feeding point of the antenna unit 300 and the joining end 530 is connected with the joining portion 210 of PCB unit 200.

The connecting part 520 may be configured variously. The embodiment shown in FIG. 3 presents that a contacting member 521 is provided at the connecting part 520. The connecting part 520 will described later.

On the other hand, in reference to FIG. 4, the antenna unit will be explained in detail.

Figure 4:
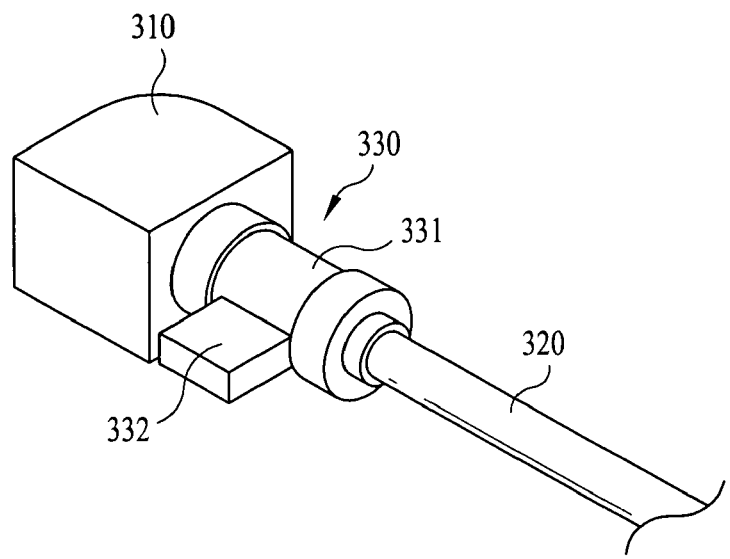
FIG. 4 is a diagram illustrating an antenna unit shown in FIG. 3.

As shown in FIG. 4, the feeding part 330 is provided in the mobile communication terminal according to the embodiment of the present invention to form a feeding point of the antenna unit 300. The feeding part 330 forms the feeding point, and guides the head part 310 and the body part 320 to be slide.

The feeding part 330 includes a guide 331 and a connector 332. The guide 331 guides the body part 320 of the antenna unit 300 to sliding move when the body part 320 is sliding in and out the body 100. The connector 332 forms a feeding point.

The guide 331 and the connector 332 may be formed as one body or be coupled to each other.

It is preferable that the feeding part 330 is formed of conductive material, because it supplies the power to the antenna unit.

However, if the antenna unit 300 is seated in the antenna seating portion 113 and connected to the FPCB unit 500 as shown in FIG. 3, there may be a step between the connector 332 and the guide 331 as shown in FIG. 4 because of their thickness difference.

If the antenna unit 300 is seated in the antenna seating portion 113 of the first case 110 and connected to the FPCB unit 500 before the second case 120 is coupled to the first case 110 as shown FIG. 3, the FPCB unit 500 is not connected with the connector 332 because of the stepped portion as shown in FIG. 4.

Thus, there may be various embodiments for connecting the FPCB unit 500 with the connector 332 and several ones of them are shown in FIGS. 5 to 9.

In reference to FIGS. 5 to 9, each embodiment will be explained.

Figure 5:
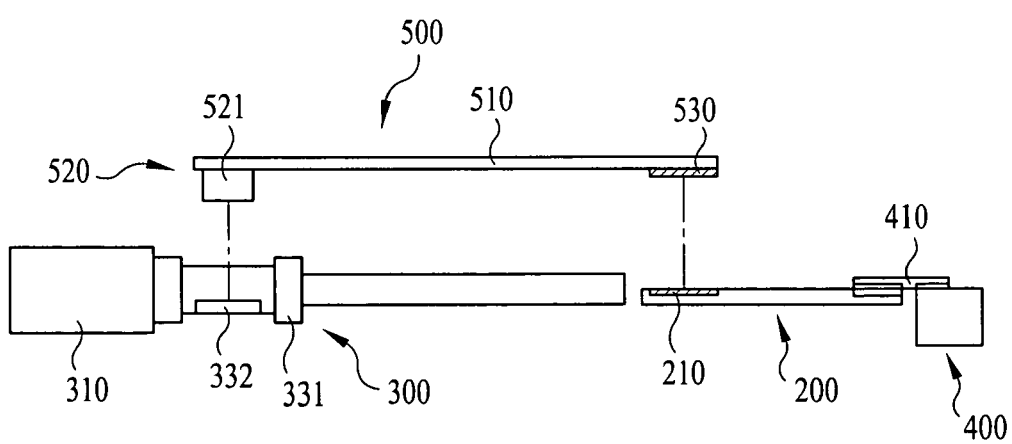
FIG. 5 is a diagram illustrating key parts of the mobile communication terminal according to the embodiment of the present invention.

As shown FIG. 5, the antenna unit 300 is connected with the PCB unit 200, and the PCB unit 200 is connected with the intenna unit 400.

That is, the connector 332 of the feeding part 330 of the antenna unit 300 is connected with the joining portion 210 of the PCB unit 200 by the FPCB unit 500. The PCB unit 200 is connected with the intenna unit 400 by a connecting member 410.

The connecting member 410 may be embodied as FPCB (Flexible Printed Circuit Board) or variations of it. This can be applicable to all of the embodiments shown in FIGS. 5 to 9 and thus detailed description thereof will be omitted.

As shown in FIG. 5, there is the stepped portion between the guide 331 and the connector 332 of the feeding part 330 because of their thickness difference, and a contacting member 521 of the connecting part 520 of the FPCB 500 compensates the step.

That is, the contacting member 521 is secured to an end of the FPCB 510 to be configured of the connecting part 520 and the contacting member 521 is contacted with the connector 332.

Here, the contacting member 521 is formed of electrically conductive material. It is preferable that adhesive material is coated between the contacting member 521 and the connector 332 to closely contact the contacting member 521 to the connector 332. It is also preferable that the adhesive material has good conductivity.

Figure 6:
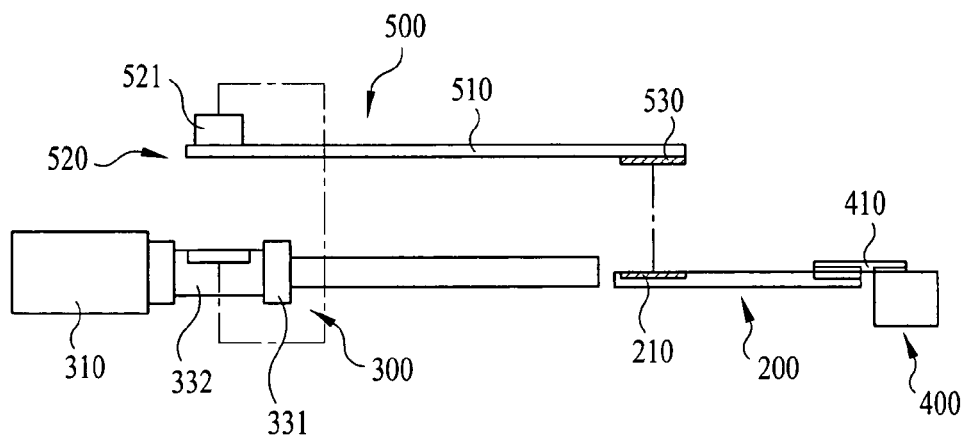
FIG. 6 is a diagram illustrating key parts of a mobile communication terminal according to another embodiment of the present invention.

On the other hand, as shown in FIG. 6, the connector 332 may be positioned at an upper surface of the guide 331 with respect to a thickness direction.

In this case, the connecting part 520 of the FPCB 500 may be positioned below the connector 332.

As shown in FIG. 5, the connecting part 520 is embodied by the contacting member 521 and adhesive material with electric conductivity is coated between a lower surface of the connector 332 and the contacting member 521, only to be adhered to each other.

The embodiment shown in FIGS. 5 and 6 presents that the connector 332 and the guide 332 have different thickness, which results in a step. However, the thickness of the connector 332 might be identical to or larger than that of the guide 331.

In this case, it is not necessary that the contacting member 521 should be provided. An end of the FPCB 510 is directly contacted with the connector 332 and maintains the contact.

Figure 7:
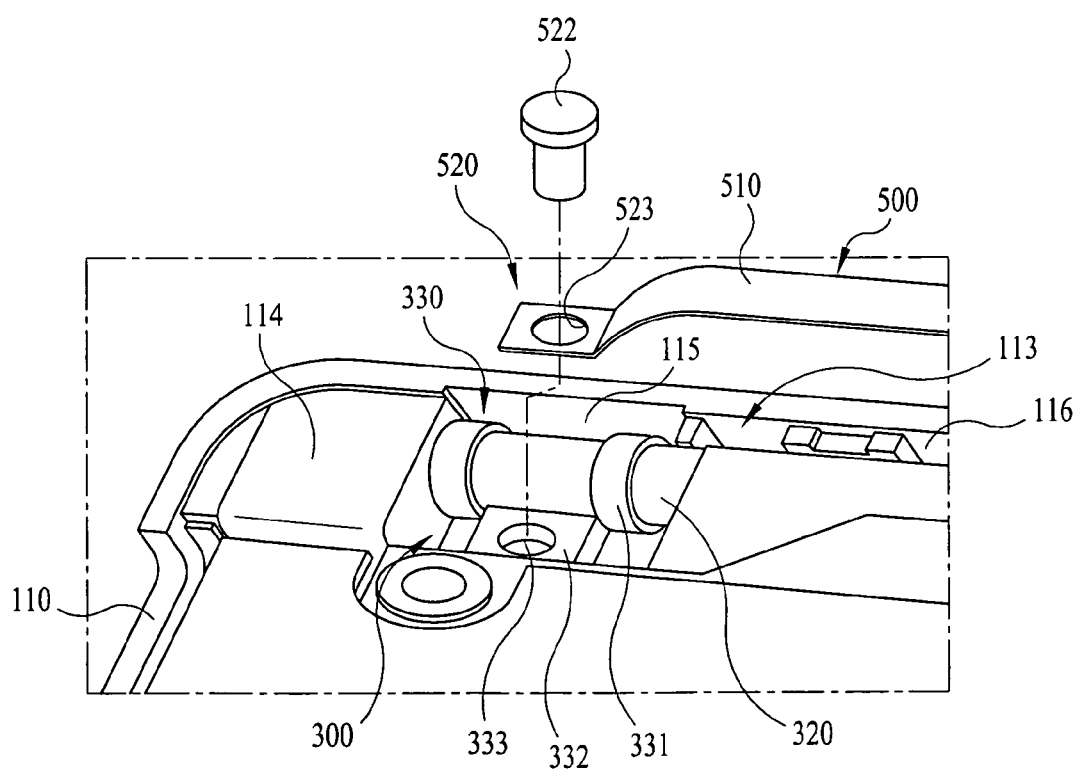
FIG. 7 is a perspective view illustrating key parts of a mobile communication terminal according to a further embodiment of the present invention.

Next, an embodiment shown in FIGS. 7 and 8 will be explained. As shown in FIGS. 7 and 8, a combining hole 333 is formed at the connector 332 of the feeding part 330 and a corresponding hole 523 of the combining hole 333 is formed at the connecting part 520 of the FPCB unit 500.

As a result, as shown in FIGS. 7 and 8, a combining member 522 is passing through the combining hole 333, in a state of the combining hole 333 facing the corresponding hole 523 of the connecting part 520. Hence, the combining member 522 is inserted in the combining hole 333 to maintain the connection between the connector 332 and the FPCB unit 500.

The other configuration of this embodiment is identical to the embodiment shown in FIG. 3, except for the configuration of the feeding part 330 and the connecting part 520 of the FPCB unit 500, and its detailed description will be omitted.

FIGS. 7 and 8 present that the connecting part 520 is contacted with an upper surface of the connector 332. However, it is possible for the connecting part 520 of the FPB unit 500 to be contacted with the lower surface of the connector 332. At this time, the combining member 522 may be coupled in a downward or upward direction.

Next, an embodiment shown in FIG. 9 will be explained. As shown in FIG. 9, a bonding member 524 is provided between the connector 332 and an end of the FPCB 510 to contact the connector with the FPCB. The bonding member 524 is formed of electrically conductive material.

To maintain the contact between the bonding member 524 and the FPCB 510 by the bonding member 524 more securely, it is preferable that a holding member 525 is provided on the FPCB where the FPCB unit is contacted with the connector 332.

The holding member 525 presses the FPCB unit 500 with a predetermined pressure of the body (100, see FIGS. 1 to 3) inside. As a result, the contact between the FPCB unit 500 and the connector 332 can be secure more efficiently.

It is also preferable that adhesive material is coated between the portion where the FPCB unit 500 is contacted with the connector 332 and the holding member 525, together with the pressure of the holding member 525.

In reference to FIG. 10, the FPCB will be explained in detail.

Figure 10:
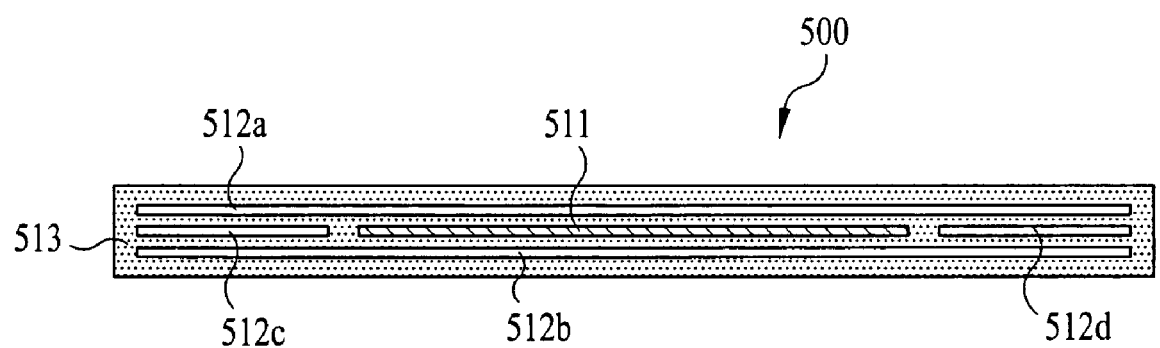
FIG. 10 is a diagram illustrating a section of I-I of a FPCB shown in FIG. 3.

As shown in FIG. 10, the FPCB 510 is formed thin and a signal part 511 is provided at a center of the FPCB 510. Also, ground parts 512a, 512b, 512c and 512d are provided in an upper, lower, right and left portion thereof, respectively.

The signal part 511 transmits an electrical signal between the connector (332, see FIG. 3) and the PCB unit (200, see FIG. 3).

In addition, the upper ground part 512a is provided above the signal part 511 and the lower ground part 512b is provided below the signal part 511. The right ground part 512c and the left ground part 512d are provided in right and left of the signal part 511, respectively.

Each of the ground part 512a, 512b, 512c and 512d is spaced apart a predetermined distance one another and each ground is in communication one another via a via-hole (not shown).

The signal part 511 and the ground parts 512a, 512b, 512c and 512d are filled with and surrounded by a dielectric substance 513. Here, the dielectric substance 513 may be embodied by various kinds of materials, for example, epoxy.

The signal part 511 can transmit an electric signal with the least of external influences, because the ground parts 512a/512b, 512c and 512d are provided in each four directions of the signal part 511, respectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile communication terminal comprising:
a body;
a PCB unit provided in a portion of the body for prescribed parts to be mounted;
an antenna unit provided in another portion of the body, wherein a feeding point of the antenna unit is apart from the PCB unit, the antenna unit including:
a head part provided on an external of the body;

a body part provided in the body, and selectively sliding out from the body or sliding into the body; and
a feeding part formed of the feeding point, and guiding the body part sliding;
a feeding connector which connects the feeding point with the PCB unit; and
an intenna unit provided in the body to be adjacent to and electrically connected with the PCB unit,
wherein the body further includes:
a first case forming a front portion of the terminal;
a second case forming a rear portion of the terminal;
a recess provided on an upper portion of the rear of the second case for a battery to be mounted;
a first rear housing portion provided on a lower portion in the second case for the PCB unit to be positioned; and
a second rear housing portion provided on a position lower than the first rear housing portion for the intenna unit to be positioned.

2. The mobile communication terminal of claim 1, wherein the feeding part comprises:
a guide guiding the body part which slides in and out the body; and
a connector projected from the guide or combined to the guide, wherein the connector electrically connects with the feeding connector.

3. The mobile communication terminal of claim 2, wherein the feeding connector comprises a FPCB unit of which an end portion is connected with the connector and the other end portion is connected with the PCB unit.

4. The mobile communication terminal of claim 2, wherein the FPCB unit comprises:
an FPCB which transmits an electric signal between the feeding part and the PCB unit;
a joining end connected with the PCB unit; and
a connecting part electrically connected with the connector.

5. The mobile communication terminal of claim 4, wherein the connecting part comprises a contacting member which electrically contacts with the connector to be fixed with the end portion of the FPCB, wherein the contacting member is formed of an electrically conductive material.

6. The mobile communication terminal of claim 4, wherein the connecting part comprises:
a hole provided on the end portion of the FPCB;
a combining hole provided on the connector of the feeding part; and
a combining member inserted in the hole and the combining hole, to combine the FPCB with the feeding part.

7. The mobile communication terminal of claim 4, wherein the connecting part comprises a bonding member of which a surface bonds with the connector and the other surface bonds with the end portion of the FPCB, wherein the bonding member is formed of an electrically conductive material.

8. The mobile communication terminal of claim 7, further comprising a holding member which holds the bonding status of the FPCB and the connector.

9. The mobile communication terminal of claim 1, wherein the body further comprises:
a first front housing portion provided on a lower portion in the first case for the PCB unit to be positioned; and
a second front housing portion provided on a position lower than the first front housing portion for the intenna unit to be positioned.

10. The mobile communication terminal of claim 9, wherein the body further comprises an antenna seating portion provided on a side portion in the body for the antenna unit to be positioned.

11. The mobile communication terminal of claim 10, wherein the antenna seating portion comprises:
a head seating portion provided on an end portion of the body for the head part to be positioned;
a holding portion provided on an upper portion of the antenna seating portion for the feeding part to be positioned; and
a body seating portion provided on a side portion in the body for the body part to be positioned.

12. A mobile communication terminal comprising:
a body including a first body having a recess provided on an upper portion of the rear of the first body for a battery to be mounted and a second body combined with the first body slidably or rotatably;
a PCB unit provided in a portion of the body for prescribed parts to be mounted;
an antenna unit provided in another portion of the body, wherein a feeding point of the antenna unit is apart from the PCB unit, the antenna unit including:
a head part provided on an external of the body;
a body part provided in the body, and selectively sliding out from the body or sliding into the body; and
a feeding part formed of the feeding point, and guiding the body part sliding;
a feeding connector which connects the feeding point with the PCB unit; and
an intenna unit provided in the body to be adjacent to and electrically connected with the PCB unit.

13. The mobile communication terminal of claim 12, wherein the first body comprises:
a first housing portion provided on a lower portion in the first body for the PCB unit to be positioned;
a second housing portion provided on a position lower than the first housing portion for the intenna unit to be positioned;
an antenna seating portion provided on a side portion in the first body for the antenna unit to be positioned; and
a holding portion provided on an upper portion of the antenna seating portion for the feeding part to be positioned.

14. A mobile communication terminal comprising:
a body having a first portion and a second portion;
a PCB provided in the first portion of the body;
an antenna unit provided in the second portion of the body, the antenna unit including:
a head part arranged externally of the body;
a body part provided in the body, the body part being slidable within the body to extend the head part; and
a feeding part providing a feeding point spaced from the PCB, the feeding part being configured to guide the sliding of the body part; and
a feeding connector connecting the feeding point of the antenna unit to the PCB,
wherein a side portion of body includes an antenna seating portion, the antenna seating portion including:
a body seating portion located at a lower portion of the antenna seating portion, the body seating portion configured to receive the body part of the antenna unit therein;
a holding portion located at an upper portion of the antenna seating portion, the holding portion having the feeding part located therein; and a wall separating the holding portion from the body seating portion.

15. The mobile communication terminal of claim 14, wherein the feeding part of the antenna unit includes a guide portion receiving the body part of the antenna unit therein and a member extending from the guide portion, the member having a hole to receive a combining member.

16. The mobile communication terminal of claim 15, wherein the combining member connects the feeding connector to the feeding part of the antenna unit.

17. The mobile communication terminal of claim 15, wherein the feeding part is fixed to the body by the combining member passing through the combining hole.

18. The mobile communication terminal of claim 14, wherein the feeding connector electrically connects the feeding point of the antenna unit to the PCB.

19. A mobile communication terminal comprising:
a body having a first portion and a second portion;
a PCB provided in the first portion of the body;
an antenna unit provided in the second portion of the body, the antenna unit including:
a head part arranged externally of the body;
a body part provided in the body, the body part being slidable within the body to extend the head part; and
a feeding part providing a feeding point spaced from the PCB, the feeding part being configured to guide the sliding of the body part; and
a feeding connector connecting the feeding point of the antenna unit to the PCB,
wherein the feeding part of the antenna unit includes a guide portion receiving the body part of the antenna unit therein and a member extending from the guide portion, the member having a hole to receive a combining member.

20. The mobile communication terminal of claim 19, wherein the combining member connects the feeding connector to the feeding part of the antenna unit.

21. The mobile communication terminal of claim 19, wherein the feeding part is fixed to the body by the combining member passing through the combining hole.

22. The mobile communication terminal of claim 19, wherein the feeding connector electrically connects the feeding point of the antenna unit to the PCB.

* * * * *